(12) United States Patent
Yoshida et al.

(10) Patent No.: US 9,780,867 B2
(45) Date of Patent: Oct. 3, 2017

(54) OPTICAL COMMUNICATION SYSTEM AND OPTICAL COMMUNICATION ABNORMALITY-RECOVERY METHOD

(71) Applicant: NIPPON TELEGRAPH AND TELEPHONE CORPORATION, Tokyo (JP)

(72) Inventors: Tomoaki Yoshida, Yokosuka (JP); Shin Kaneko, Yokosuka (JP); Shunji Kimura, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 15/029,489

(22) PCT Filed: Oct. 21, 2014

(86) PCT No.: PCT/JP2014/077894
§ 371 (c)(1),
(2) Date: Apr. 14, 2016

(87) PCT Pub. No.: WO2015/060277
PCT Pub. Date: Apr. 30, 2015

(65) Prior Publication Data
US 2016/0269105 A1    Sep. 15, 2016

(30) Foreign Application Priority Data

Oct. 25, 2013  (JP) .................................. 2013-221859

(51) Int. Cl.
*H04B 10/00* (2013.01)
*H04B 10/032* (2013.01)
(Continued)

(52) U.S. Cl.
CPC ......... *H04B 10/032* (2013.01); *H04B 10/272* (2013.01); *H04J 14/0256* (2013.01);
(Continued)

(58) Field of Classification Search
USPC .............................................. 398/66–73, 1–9
See application file for complete search history.

(56) References Cited

U.S. PATENT DOCUMENTS 6,868,232 B2 * 3/2005 Eijk ..................... H04B 10/032
                                                           398/145
8,285,139 B2 * 10/2012 Zhou ................ H04B 10/07953
                                                           398/17
(Continued)

FOREIGN PATENT DOCUMENTS

CN     1445956 A     10/2003
CN     1454418 A     11/2003
(Continued)

OTHER PUBLICATIONS

Japanese Office Action dated Aug. 30, 2016 from corresponding Japanese Patent Application No. 2015-543853; 13 pages.
(Continued)

*Primary Examiner* — Agustin Bello
(74) *Attorney, Agent, or Firm* — Ohlandt, Greeley, Ruggiero & Perle L.L.P.

(57) ABSTRACT

In an optical communication abnormality-recovery system and method, when an abnormality occurs in transmission and reception of one wavelength of an optical line terminal of a PON system, an optical network unit that is performing communication at a certain wavelength switches the wavelength for performing the communication to another backup wavelength that is instructed in advance. The optical line terminal also performs switching so that the communication is performed using the same backup wavelength as in the optical network unit.

16 Claims, 8 Drawing Sheets

(51) Int. Cl.

| | | |
|---|---|---|
| *H04B 10/272* | (2013.01) | |
| *H04J 14/02* | (2006.01) | |
| *H04J 14/08* | (2006.01) | |
| *H04Q 11/00* | (2006.01) | |
| *H04L 12/26* | (2006.01) | |
| *H04L 12/24* | (2006.01) | |

(52) U.S. Cl.
CPC ...... *H04J 14/0268* (2013.01); *H04J 14/0282* (2013.01); *H04J 14/0294* (2013.01); *H04J 14/08* (2013.01); *H04Q 11/0067* (2013.01); *H04L 41/0663* (2013.01); *H04L 43/0864* (2013.01); *H04Q 2011/0016* (2013.01); *H04Q 2011/0081* (2013.01); *H04Q 2213/1301* (2013.01)

(56) References Cited

U.S. PATENT DOCUMENTS

| | | | | |
|---|---|---|---|---|
| 8,606,100 | B2* | 12/2013 | Kim | H04J 14/0223 370/352 |
| 8,744,263 | B2* | 6/2014 | Ohlen | H04B 10/272 398/70 |
| 8,744,265 | B2* | 6/2014 | Effenberger | H04B 10/272 398/14 |
| 8,768,163 | B2* | 7/2014 | Kim | H04Q 11/0067 398/33 |
| 8,953,936 | B2* | 2/2015 | Hood | H04B 10/032 398/66 |
| 8,977,127 | B2* | 3/2015 | Luo | H04J 14/02 398/17 |
| 9,197,353 | B2* | 11/2015 | Lee | H04J 14/025 |
| 9,350,482 | B2 | 5/2016 | Tamaki et al. | |
| 2002/0027682 | A1* | 3/2002 | Iwasaki | H04Q 11/0062 398/9 |
| 2002/0030865 | A1* | 3/2002 | Kawate | H04Q 11/0062 398/33 |
| 2002/0071149 | A1* | 6/2002 | Xu | H04B 10/032 398/5 |
| 2002/0085492 | A1* | 7/2002 | Mukai | H04L 12/5601 370/230 |
| 2003/0137932 | A1 | 7/2003 | Nishioka et al. | |
| 2004/0095884 | A1* | 5/2004 | Lee | H04Q 11/0067 370/235 |
| 2004/0255049 | A1* | 12/2004 | Italiano | H04L 12/4641 709/250 |
| 2005/0276603 | A1* | 12/2005 | Jung | H04J 14/0226 398/71 |
| 2006/0062576 | A1* | 3/2006 | Nakamura | H04J 14/0226 398/72 |
| 2007/0092254 | A1* | 4/2007 | Bouda | H04J 14/0226 398/72 |
| 2007/0092256 | A1* | 4/2007 | Nozue | H04J 14/0282 398/72 |
| 2008/0037981 | A1* | 2/2008 | Mukojima | H04Q 11/0067 398/10 |
| 2008/0138063 | A1* | 6/2008 | Akasaka | H04J 14/0291 398/4 |
| 2008/0138072 | A1* | 6/2008 | Sakamoto | H04J 14/0226 398/68 |
| 2008/0187310 | A1* | 8/2008 | Tanaka | H04J 3/14 398/9 |
| 2008/0232819 | A1* | 9/2008 | Mukai | H04L 12/5695 398/168 |
| 2008/0267627 | A1* | 10/2008 | Effenberger | H04B 10/272 398/72 |
| 2009/0080889 | A1* | 3/2009 | Nozue | H04J 14/0282 398/69 |
| 2009/0162065 | A1* | 6/2009 | Mizutani | H04J 3/0655 398/66 |
| 2009/0201801 | A1* | 8/2009 | Ono | H04B 7/2606 370/221 |
| 2010/0158512 | A1* | 6/2010 | Chang | H04J 14/0282 398/7 |
| 2010/0189442 | A1* | 7/2010 | Grobe | H04J 3/085 398/79 |
| 2010/0221007 | A1* | 9/2010 | Sakamoto | H04J 14/0226 398/67 |
| 2010/0316373 | A1* | 12/2010 | Chang | H04B 10/071 398/12 |
| 2011/0085795 | A1* | 4/2011 | Ozaki | H04J 14/0282 398/25 |
| 2011/0091213 | A1* | 4/2011 | Kawaza | H04J 14/0282 398/68 |
| 2011/0229140 | A1* | 9/2011 | Ohlen | H04B 10/272 398/79 |
| 2012/0014693 | A1* | 1/2012 | Cheng | H04J 14/0282 398/34 |
| 2012/0237213 | A1* | 9/2012 | Yin | H04L 43/50 398/28 |
| 2013/0034356 | A1* | 2/2013 | Luo | H04B 10/272 398/72 |
| 2013/0084067 | A1* | 4/2013 | Iwamura | H04J 14/0216 398/48 |
| 2013/0089319 | A1* | 4/2013 | Grobe | H04J 14/0227 398/7 |
| 2013/0148956 | A1* | 6/2013 | Khotimsky | H04B 10/032 398/2 |
| 2013/0216224 | A1* | 8/2013 | Patel | H04J 14/0278 398/49 |
| 2013/0216225 | A1* | 8/2013 | Patel | H04Q 11/0005 398/49 |
| 2013/0223841 | A1* | 8/2013 | Lee | H04J 14/0232 398/72 |
| 2014/0056581 | A1* | 2/2014 | Tremblay | H04L 41/0654 398/1 |
| 2014/0233944 | A1* | 8/2014 | Vetter | H04J 14/0282 398/34 |
| 2014/0233954 | A1* | 8/2014 | Lee | H04J 14/0246 398/72 |
| 2014/0270770 | A1* | 9/2014 | Lutgen | H04J 14/0221 398/66 |
| 2014/0314414 | A1* | 10/2014 | Cheng | H04J 14/02 398/68 |
| 2015/0037035 | A1* | 2/2015 | Sugawa | H04J 14/08 398/66 |
| 2015/0050024 | A1* | 2/2015 | Luo | H04B 10/27 398/68 |
| 2015/0229430 | A1* | 8/2015 | Liang | H04J 14/0242 398/68 |
| 2016/0006608 | A1* | 1/2016 | Khotimsky | H04J 14/026 398/48 |
| 2016/0248539 | A1* | 8/2016 | Kaneko | H04J 14/0282 |
| 2016/0269105 | A1* | 9/2016 | Yoshida | H04B 10/032 |

FOREIGN PATENT DOCUMENTS

| | | |
|---|---|---|
| CN | 1717885 A | 1/2006 |
| CN | 1897591 A | 1/2007 |
| CN | 101826919 A | 9/2010 |
| CN | 101841746 A | 9/2010 |
| CN | 102932056 A | 2/2013 |
| CN | 103118309 A | 5/2013 |
| EP | 0853394 A2 | 7/1998 |
| EP | 2309666 A2 | 4/2011 |
| JP | 8-505270 | 6/1996 |
| JP | 2003-218912 | 7/2003 |
| JP | 2011-82908 | 4/2011 |
| JP | 2012-130079 | 7/2012 |
| WO | 9407340 | 3/1994 |
| WO | 2013108577 A1 | 7/2013 |

OTHER PUBLICATIONS

Hara et al.; "Flexible Load Balancing Technique Using Dynamic Wavelength Bandwidth Allocation (DWBA) Toward 100Gbit/s-

(56) References Cited

OTHER PUBLICATIONS

Class-WDM/TDM-PON"; ECOC; Torino, Italy; Feb. 19-23, 2010; 3 pages.
Kimura, "WDM/TDM-PON Technologies for Future Flexible Optical Access Networks"; 15th OptoElectronics and Communications Conference (OECC2010) Technical Digest; Jul. 2010; Sapporo Convention Center, Japan; 2 pages.
Tamaki et al.; "A Tunable WDM/TDM-PON System for Future Optical Access Network"; The Institute of Electronics, Information and Communication Engineers; 2012; 14 pages.
Kaneko et al.; "Agile OLT-Protection Method Based on Backup Wavelength and Discovery Process for Resilient WDM/TDM-PON"; ECOC; Cannes, France; 2014; 3 pages.
International Search Report dated Nov. 25, 2014 from corresponding International Application No. PCT/JP2014/077894, 5 pages.
Written Opinion dated Nov. 25, 2014 from PCT /JP2014/077894, 7 pages.
International Preliminary Report on Patentability dated May 6, 2016 from corresponding International Patent Application No. PCT/JP2014/077894, 11 pages.
First Chinese Office Action in the corresponding Chinese Application No. 201480057981.1, dated May 22, 2017, 13 pages.

\* cited by examiner

ONU #1

| CURRENT DOWNSTREAM WAVELENGTH | BACKUP DOWNSTREAM WAVELENGTH |
|---|---|
| $\lambda_{1d}$ | $\lambda_{2d}$ |

ONU #2

| CURRENT DOWNSTREAM WAVELENGTH | BACKUP DOWNSTREAM WAVELENGTH |
|---|---|
| $\lambda_{2d}$ | $\lambda_{3d}$ |

· · ·

ONU #h

| CURRENT DOWNSTREAM WAVELENGTH | BACKUP DOWNSTREAM WAVELENGTH |
|---|---|
| $\lambda_{md}$ | $\lambda_{1d}$ |

| OLT | CURRENT UPSTREAM WAVELENGTH | CURRENT DOWNSTREAM WAVELENGTH | BACKUP UPSTREAM WAVELENGTH | BACKUP DOWNSTREAM WAVELENGTH |
|---|---|---|---|---|
| ONU #1 | $\lambda_{1u}$ | $\lambda_{1d}$ | $\lambda_{2u}$ | $\lambda_{2d}$ |
| ONU #2 | $\lambda_{2u}$ | $\lambda_{2d}$ | $\lambda_{3u}$ | $\lambda_{3d}$ |
| ... | ... | ... | ... | ... |
| ONU #h | $\lambda_{mu}$ | $\lambda_{md}$ | $\lambda_{1u}$ | $\lambda_{1d}$ |

| OSU | UPSTREAM WAVELENGTH | DOWNSTREAM WAVELENGTH | ALLOCATED ONU |
|---|---|---|---|
| OSU #1 | $\lambda_{1u}$ | $\lambda_{1d}$ | ONU #1 |
| OSU #2 | $\lambda_{2u}$ | $\lambda_{2d}$ | ONU #2 |
| ... | ... | ... | ... |
| OSU #3 | $\lambda_{mu}$ | $\lambda_{md}$ | ONU #h |

FIG. 6

OPTICAL COMMUNICATION SYSTEM AND OPTICAL COMMUNICATION ABNORMALITY-RECOVERY METHOD

BACKGROUND

1. Field of the Disclosure

The present disclosure relates to an improvement in availability in a passive optical network (PON) in which wavelength multiplexing and time division multiplexing are combined.

2. Discussion of the Background Art

With the recent rapid spread of the Internet, access service systems have been required to be increased in capacity, advanced, and economized, and a passive optical network (PON) has been studied as a means for implementing them. The PON is an optical communication system in which economization is pursued by sharing one optical line terminal and a part of a transmission path by a plurality of optical network units using an optical multiplexer/demultiplexer based on an optical passive element.

Currently, in Japan, an economic optical subscriber system, Gigabit Ethernet (a registered trademark) passive optical network (GE-PON) in which a circuit capacity of 1 Gbps is shared by up to 32 users with time division multiplexing (TDM) has mainly been introduced. This made it possible to provide a fiber to the home (FTTH) service at a realistic rate.

In order to deal with the need of a larger capacity, a 10 Gigabit Ethernet (a registered trademark) passive optical network (10 GE-PON) with a total band of 10 Gbps class has been studied as a next generation optical subscriber system and approved as an international standard in 2009. This is an optical subscriber system in which a large capacity is implemented while using the same one as that of the GE-PON as a transmission path portion such as an optical fiber by increasing a bit rate of a transceiver.

In the future, a large-capacity service exceeding 10 G class such as an ultra high-definition video service or a ubiquitous service is considered to be required, but when the bit rate of the transceiver is simply increased from a 10 G class to a 40/100 G class, there is a problem in that a system upgrade cost is increased, and thus it is difficult to put it to practical use.

As a means for solving this, a wavelength tunable WDM/TDM-PON in which wavelength tenability is added to a transceiver so that the transceiver in an optical line terminal can be extended according to a bandwidth requirement in a stepwise manner, and time division multiplexing (TDM) and wavelength division multiplexing (WDM) are effectively combined has been reported (for example, see Non Patent Literature 1).

The wavelength tunable WDM/TDM-PON has recently attracted attention as a system in which a gradual total band increase and flexible load distribution are possible according to a user's demand as in Non Patent Literature 2, and at the time of the gradual total band increase, a dynamic wavelength and bandwidth allocation (DWBA) algorithm is used for update of an associated optical subscriber unit (OSU) by load distribution. The DWBA is implemented by a combination of uplink dynamic bandwidth allocation (DBA) from an optical network unit (ONU) in an associated OSU and wavelength switching for switching an associated OSU.

FIG. 1 is an example of a configuration diagram illustrating a wavelength tunable WDM/TDM-PON system related to the present disclosure. The wavelength tunable WDM/TDM-PON system related to the present disclosure includes an optical line terminal (OLT) 10 and an ONU 20. The OLT 10 includes a DWBA circuit 101, a multiplexing/separating unit 106, and an OSU 107. The OLT 10 is connected with the ONU 20 by a PON topology of a point-to-multipoint configuration using an optical multiplexer/demultiplexer 11 and an optical multiplexer/demultiplexer 12. Examples of the optical multiplexer/demultiplexer 11 and the optical multiplexer/demultiplexer 12 include a power splitter and a wavelength router. 13 indicates an optical fiber, 14 indicates an optical fiber, 15 indicates an optical fiber, 16 indicates an optical fiber, and 40 indicates a relay network.

The OLT 10 of FIG. 1 includes m line card OSUs 107 that transmit and receive m types of wavelength sets of $\lambda_{1d}$ and $\lambda_{1u}$ to $\lambda_{md}$ and $\lambda_{mu}$, the DWBA circuit 101, and the multiplexing/separating unit 106. The OSUs #1 to #m transmit and receive wavelength signals of $\lambda_{1d}$ and $\lambda_{1u}$ to $\lambda_{md}$ and $\lambda_{mu}$ transmitted from the ONU 20. The OLT 10 is connected to h ONUs 20 through the optical multiplexer/demultiplexer 11, the optical multiplexer/demultiplexer 12, the optical fiber 13, the optical fiber 14, the optical fiber 15, and the optical fiber 16, and each of the ONUs 20 performs transmission and reception using any one of wavelength sets $\lambda_{1d}$ and $\lambda_{1u}$ to $\lambda_{md}$ and $\lambda_{mu}$ each of which serves as a set of downlink and uplink wavelengths. Each of the ONUs 20 can switch wavelengths of $\lambda_{1d}$ and $\lambda_{1u}$ to $\lambda_{md}$ and $\lambda_{mu}$ according to an instruction given from the OLT 10 and perform transmission and reception.

An uplink signal from a communication device installed in a house of a user is input to each of the ONUs 20, and transmitted as an uplink optical signal through an optical transceiver in the ONU 20. Since the uplink signals are multiplexed to one optical fiber 13 from the optical multiplexer/demultiplexer 11 at the ONU 20 side toward the OLT 10, the OLT 10 calculates and controls a transmission time and a transmission duration of the uplink signal transmitted by each of the ONUs 20 so that the uplink signals do not overlap. Uplink signal 1 to m received by the OSUs #1 to #m are aggregated and multiplexed into one uplink signal by the multiplexing/separating unit 106 in the OLT 10, and the uplink signal is transmitted to the relay network 40 side. On the other hand, a downlink signal to be transmitted from the relay network 40 side to the ONUs 20 is separated into downlink signals 1 to m to be transmitted to the OSUs #1 to #m through the multiplexing/separating unit 106 based on destination ONU 20 information described in the downlink signal and information of the OSU 107 to which the ONU 20 belongs. The separated downlink signals 1 to m are transmitted to the ONUs 20 at wavelengths of $\lambda_{1d}$ and $\lambda_{1u}$ to $\lambda_{md}$ and $\lambda_{mu}$ of the OSUs #1 to #m. The downlink signals are broadcast to the ONUs 20 at the wavelengths of the OSUs 107, but since transmission and reception wavelengths of the ONU 20 are set to transmission and reception wavelengths of the associated OSUs 107, the ONU 20 selects information addressed to its own device from the received wavelength signal, and the ONU 20 outputs the selected information to the communication device in the house of the user.

The DWBA circuit 101 includes a DWBA calculating unit 103, a switching instruction signal generating unit 102, a control signal transmitting unit 104, and a request signal receiving unit 105. The request signal receiving unit 105 receives signals including a bandwidth request transmitted from the ONUs 20 through the OSUs 107, the DWBA calculating unit 103 calculates transmission times and transmission durations of uplink data signals and the request signals allocated to the ONUs 20 based on the request, and the switching instruction signal generating unit 102 generates an instruction signal storing the information, and causes the control signal transmitting unit 104 to transmit the instruction signal to each of the ONUs 20 through each of the OSUs 107. Further, the DWBA calculating unit 103 manages connection information of a PON zone, that is, a zone in which a plurality of ONUs 20 are connected with a plurality of OSUs 107 through the optical fiber 13, the optical fiber 14, the optical fiber 15, the optical fiber 16, the optical multiplexer/demultiplexer 11, and the optical multiplexer/demultiplexer 12. The downlink signal output from the multiplexing/separating unit 106 is relayed through the OSU 107 and transmitted to the ONU 20. When a wavelength used for communication by the ONU 20, the DWBA calculating unit 103 instructs the multiplexing/separating unit 106 to change the OSU 107 that relays the downlink signal to be transmitted to the ONU 20 that has changed the communication wavelength.

FIG. 2 illustrates a configuration of the ONU 20. The ONU 20 includes a data receiving unit 201, a data transmitting unit 208, an uplink buffer memory 202, a downlink buffer memory 209, a destination analysis selection receiving unit 210, a frame transmission control unit 203, a frame assembly transmitting unit 204, a wavelength tunable optical transceiver 205, a request bandwidth calculating unit 206, a request signal transmitting unit 207, an instruction signal receiving unit 211, and a wavelength switching control unit 212.

The uplink signal from the user is received by the data receiving unit 201 and temporarily stored in the uplink buffer memory 202. The frame transmission control unit 203 transfers the uplink signal to the frame assembly transmitting unit 204 according to the transmission time and the transmission duration of the uplink signal instructed by instruction signal given from the OLT 10. The frame assembly transmitting unit 204 configures a frame format necessary for transmitting the signal to the OLT 10 in a PON configuration, and transfers the frame format to the wavelength tunable optical transceiver 205. Here, the PON configuration refers to a configuration in which the OLT 10 and a plurality of ONUs 20 are provided, and the OLT 10 is optically connected with the ONUs 20 through the optical fiber and the optical multiplexer/demultiplexer. The wavelength tunable optical transceiver 205 performs conversion to an optical signal at any one of the wavelengths $\lambda_{1d}$ and $\lambda_{1u}$ to $\lambda_{md}$ and $\lambda_{mu}$ instructed by the wavelength switching control unit 212, and transmits the optical signal to the OLT 10. The wavelength tunable optical transceiver 205 receives the downlink signal from the OSU 107 by selecting the instructed wavelength, and the destination analysis selection receiving unit 210 analyzes the destination of the downlink signal, selects only information addressed to its own device, and stores the selected information in the downlink buffer memory 209. The data transmitting unit 208 transmits the information stored in the downlink buffer memory 209 to the user as the downlink signal.

The wavelength tunable optical transceiver 205 receives the instruction signal from the OLT 10, converts the instruction signal into an electrical signal, and transfers the electrical signal to the instruction signal receiving unit 211. The instruction signal receiving unit 211 analyzes instruction content of the instruction signal, and transfers a switching destination wavelength and a switching execution instruction to the wavelength switching control unit 212 at an instruction time when a wavelength switching instruction, a wavelength after switching, and a switching start time are included in the instruction signal. The wavelength switching control unit 212 switches the wavelength of the wavelength tunable optical transceiver 205 according to wavelength switching control. The OLT 10 receives information about a bandwidth, requested by the ONU 20, from the ONU 20 and uses the information for bandwidth allocation. There are various methods, and, for example, an instruction may be given using the request bandwidth so that the request bandwidth information is transmitted to the OLT 10, and the ONU 20 may cause the request bandwidth information to be transmitted to the OLT 10 to be described in the request signal according to the instruction. In this case, upon receiving an instruction signal to request transmission of the request signal, the instruction signal receiving unit 211 instructs the request signal transmitting unit 207 to generate the request signal. The request signal transmitting unit 207 instructs the request bandwidth calculating unit 206 to calculate a bandwidth to be requested. The request bandwidth calculating unit 206 measures a data amount of the uplink signal stored in the buffer memory, decides a request bandwidth amount based on the data amount, and transfers the request bandwidth amount to the request signal transmitting unit 207. The request signal transmitting unit 207 generates a request signal in which the request bandwidth amount is described, and transfers the request signal to the frame transmission control unit 203.

The instruction signal may include both information about a transmission start time of a request signal and information about a transmission duration of the request signal. In this case, the instruction signal receiving unit 211 transfers both the information about the transmission start time of the request signal and the information about the transmission duration of the request signal included in the instruction signal to the frame transmission control unit 203, The frame transmission control unit 203 transfers the request signal to the frame assembly transmitting unit 204 at an instructed time, and the request signal is transmitted to the OLT 10 through the wavelength tunable optical transceiver 205. Further, the instruction signal transmitted from the OLT 10 includes a transmission start time and a transmission duration for transmitting the uplink signal received from the user side by the ONU 20 to the OLT 10. The instruction signal receiving unit 211 transfers the information about the transmission start time of the uplink signal and the information about the transmission duration of the uplink signal included in the instruction signal to the frame transmission control unit 203, and the frame transmission control unit 203 extracts the uplink signal from the buffer memory at the instructed time, and transfers the uplink signal to the frame assembly transmitting unit 204 during a period of time corresponding to the transmission duration, and the uplink signal is transmitted to the OLT 10 through the wavelength tunable optical transceiver 205.

In Non Patent Literature 3, redundancy of the OSU 107 is described as a function for increasing reliability and availability of the OLT 10. Two or more OSUs 107 are mounted in the OLT 10, and when an abnormality occurs in a certain OSU 107, communication is recovered by allocating uplink and downlink wavelengths of another OSU 107 as uplink and downlink wavelengths used by the ONU 20 to which uplink and downlink wavelengths used by the abnormal OSU 107 are allocated, and thus it is possible to prevent a communication interruption period of time when an abnormality occurs in the OSU 107.

However, in Non Patent Literature 3, the wavelength of the OSU 107 is fixed, and when an abnormality occurs in the OSU 107, communication interruption can be prevented by switching the wavelength of the ONU 20, but when the operation of the optical transceiver of the OSU 107 is stopped due to the occurrence of an abnormality in the OSU 107 or the downlink signal is lost due to a power supply interruption of the OSU 107 or the like, the ONU 20 itself needs to have an operation of selecting a switching destination OSU 107 and connecting itself to the switching destination OSU 107. In other words, the ONU 20 needs to be equipped with a mechanism for autonomously controlling the wavelength switching such that communication is recovered, but this increases the cost of the ONU 20 since the function related to the autonomous wavelength switching and the connection state recovery of the ONU 20 is mounted compared to the ONU 20 that constantly performs the wavelength switching according to the instruction given from the OLT 10. Thus, when an abnormality occurs, the mechanism for switching the wavelength has to have a simple configuration capable of suppressing the cost increase.

Further, when an abnormality occurs in the OSU 107, the ONU 20 allocated to the abnormal OSU 107 hardly receive the downlink wavelength signal of the abnormal OSU 107 and the switching instruction and hardly receives anything from the other OSUs 107 immediately. It is because the wavelength tunable optical transceiver 205 excludes the ONU 20 associated with the abnormal OSU 107, for example, using a wavelength filter in order to avoid interference with downlink wavelengths of the other OSUs 107 having different wavelengths. Thus, as described above, at a point in time at which an abnormality occurs in the OSU 107, and the ONU 20 allocated to the abnormal OSU 107 needs to recover communication through the wavelength switching, it is necessary to provide a device that selects the switching destination wavelength in a state in which information and an instruction related to the switching destination wavelength are not obtained.

CITATION LIST

Non Patent Literature

Non Patent Literature 1: Kazutaka Hara et al, "Flexible load balancing technique using dynamic wavelength bandwidth allocation (DWBA) toward 100 Gbit/s-class-WDM/TDM-PON," Tu.3.B.2, ECOC2010, 2010

Non Patent Literature 2: S. Kimura, "WDM/TDM-PON Technologies for Future Flexible Optical Access Networks," 6A1-1, OECC2010, 2010

Non Patent Literature 3: Tamaki et al., "λ-Tunable WDM/TDM-PON System for Future Optical Access Network," IEICE Technical Report, vol. 112, no. 118, pp 39-44, July, 2012

Non Patent Literature 4: S. Kaneko, T. Yoshida, S. Kimura, N. Yoshimoto, and H. Kimura, "Agile OLT-Protection Method Based on Backup Wavelength and Discovery Process for Resilient WDM/TDM-PON," ECOC 2014, Tu.1.2.4

SUMMARY

The present disclosure was made in order to solve the above problems, and it is an object of the present disclosure to provide an optical communication system and an optical communication abnormality-recovery method, which are capable of providing a function in which an ONU itself selects a switching destination OSU and is re-connected to the selected OSU, for example, when an operation of an optical transceiver of an OSU is stopped due to the occurrence of an abnormality in the OSU or a downlink signal is lost due to a power supply interruption of an OSU or the like.

In order to achieve the object, an optical communication system according to the present disclosure is an optical communication system including: a plurality of optical network units; and an optical line terminal connected with the plurality of optical network units, the optical network units and the optical line terminal switching a plurality of wavelengths and performing communication, wherein the optical network unit and the optical line terminal perform the communication using a main communication wavelength, and when an abnormality is detected to occur in the communication between the optical line terminal and the optical network unit using the main communication wavelength, the optical network unit changes a wavelength for performing the communication with the optical line terminal to a backup communication wavelength.

In the optical communication system according to the present disclosure, the optical line terminal may further include a dynamic wavelength and bandwidth allocation circuit that allocates the backup wavelength to the optical network unit in advance.

In the optical communication system according to the present disclosure, the optical line terminal may perform an initial connection operation including at least measurement of a round-trip delay time of the communication between the optical line terminal and the optical network unit using the backup communication wavelength to which the optical network unit has switched, and give an instruction indicating the main communication wavelength and the backup communication wavelength, which the optical network unit performs the communication with the optical line terminal, to the optical network unit after the initial connection operation, and the optical network unit may change the wavelength, which the optical network unit performs the communication with the optical line terminal, from the backup communication wavelength to the main communication wavelength.

In the optical communication system according to the present disclosure, the optical network unit may further include a recovery standby protection timer that measures a period of time after an abnormality occurs in the communication between the optical line terminal and the optical network unit or a period of time after the wavelength is changed to the backup communication wavelength, and when the period of time measured by the recovery standby protection timer exceeds a recovery standby period of time that is instructed in advance, the optical network unit may determine that the communication between the optical network unit and the optical line terminal using the backup communication wavelength may be in an abnormal state.

An optical communication abnormality-recovery method according to the present disclosure is an optical communication abnormality-recovery method of changing a wavelength for performing communication between an optical network unit and an optical line terminal in an optical communication system in which a plurality of optical network units is connected with an optical line terminal, and the optical network units and the optical line terminal switch a plurality of wavelengths, and perform communication, the optical communication abnormality-recovery method comprising, in order: an abnormality detection process of detecting, by the optical network unit, an abnormality in communication between the optical network unit and the optical line terminal using a main communication wavelength; and a wavelength switching process of changing the wavelength, which the optical network unit performs the communication with the optical line terminal, to a backup communication wavelength when the abnormality is detected by the abnormality detection process.

The optical communication abnormality-recovery method according to the present disclosure may further include a dynamic wavelength and bandwidth allocation process of allocating the backup communication wavelength to the optical network unit in advance.

The optical communication abnormality-recovery method according to the present disclosure may further include an initial connection operation process of performing, by the optical line terminal and the optical network unit, an initial connection operation including at least measurement of a round-trip delay time of the communication between the optical line terminal and the optical network unit using the backup communication wavelength, giving, by the optical line terminal to the optical network unit, an instruction indicating the main communication wavelength and the backup communication wavelength, which the optical network unit performs the communication with the optical line terminal, after the initial connection operation, and changing, by the optical network unit, the wavelength, which the optical network unit performs the communication with the optical line terminal, from the backup communication wavelength to the main communication wavelength after the wavelength switching process.

The optical communication abnormality-recovery method according to the present disclosure may further include a standby period of time measurement process of measuring, by the optical network unit, a period of time after an abnormality occurs in the communication between the optical line terminal and the optical network unit or a period of time after the wavelength is changed to the backup communication wavelength, wherein when the period of time measured by the standby period of time measurement process exceeds a recovery standby period of time that is instructed in advance, the communication between the optical network unit and the optical line terminal using the backup communication wavelength may be determined to be in an abnormal state.

The above disclosures can be combined wherever possible.

Advantageous Effects of Disclosure

Using the optical communication system and the optical communication abnormality-recovery method according to the present disclosure, when an abnormality occurs in an OSU, an ONU itself selects a switching destination OSU and is re-connected to the selected OSU, because of this reconnection it is possible to recover the optical communication system from the abnormality and recover communication between the optical line terminal and the optical network unit.

BRIEF DESCRIPTION OF THE DRAWINGS

FIG. 4 illustrates an example of a switching destination table in an ONU 30 when an abnormality occurs in an OSU 107 according to an embodiment of the present disclosure.

FIG. 5 illustrates an example of a switching destination table in an OLT 10 when an abnormality occurs in an OSU 107 according to an embodiment of the present disclosure.

FIG. 6 illustrates an example of an allocated ONU table when an abnormality occurs in an OSU 107 according to an embodiment.

DETAILED DESCRIPTION OF THE PREFERRED EMBODIMENT

Figure 1:
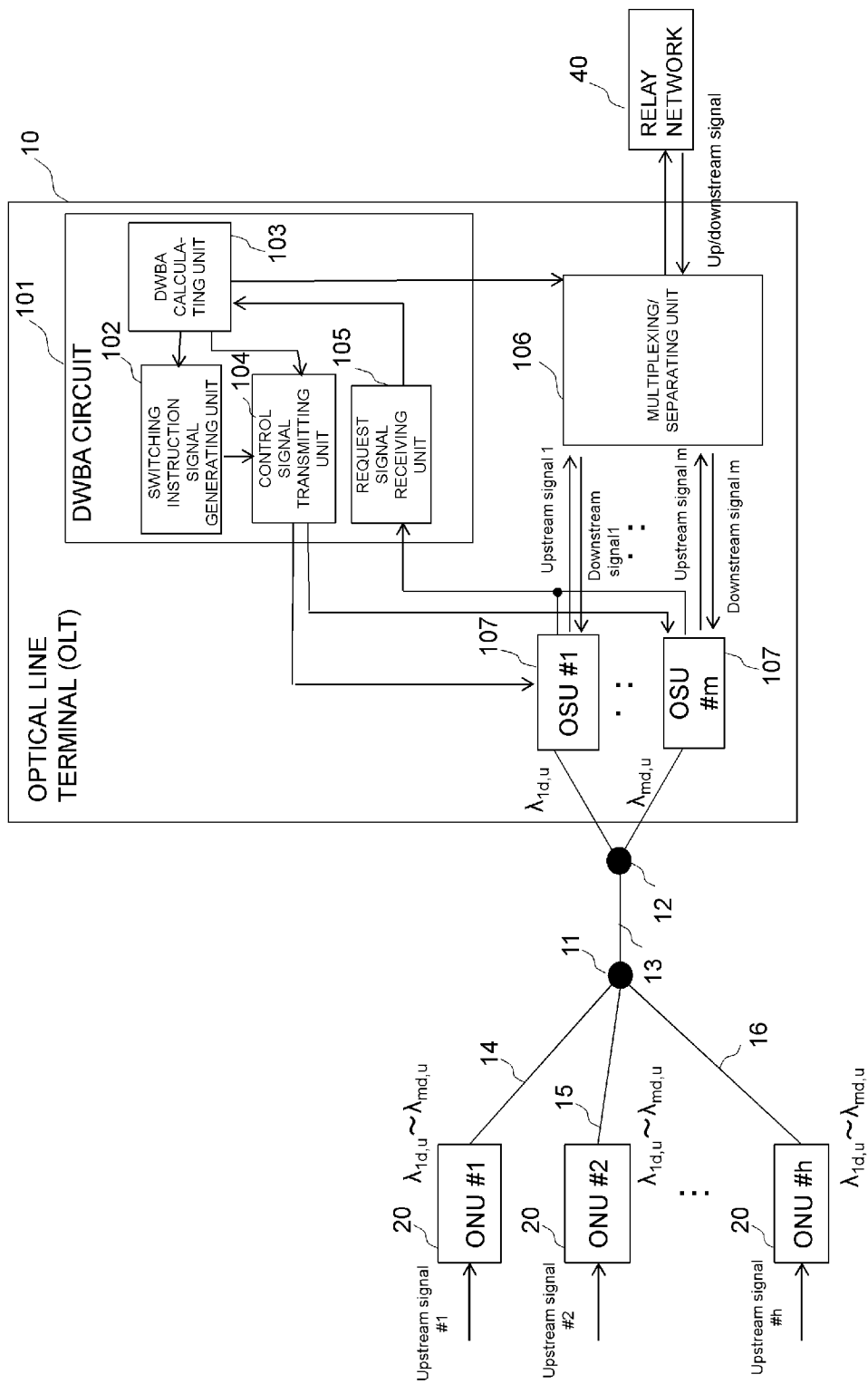
FIG. 1 is a configuration diagram illustrating an example of a wavelength tunable WDM/TDM-PON system related to the present disclosure.

Hereinafter, an embodiment of the present disclosure will be described in detail with reference to the appended drawings. The present disclosure is not limited to the following embodiment. The following embodiment is merely an example, and the present disclosure can be carried in a form in which various changes or improvements are made based on knowledge of those having skill in the art. In the present specification and the drawings, the same reference numerals denote the same components.

In an embodiment of the present disclosure, an ONU 30 includes a unit that detects the occurrence of an abnormality in the OSU 107 to which the ONU 20 is allocated, and an allocation ONU table in which uplink and downlink wavelengths of switching destinations to which a reception wavelength is switched when an abnormality occurs in the OSU 107 are described in association with all the ONUs 30 is held in the OLT 10 in advance. The downlink wavelength of the switching destination to which the reception wavelength is switched when an abnormality occurs in the OSU 107 to which the ONU 20 is allocated is held in the ONU 30 in advance. The downlink wavelength of the switching destination held in the ONU 30 is instructed from the OLT 10 at the time of initial allocation and can be changed by the OLT 10 even after a link is established. When the ONU 30 detects an abnormality (for example, signal interruption or out-of-synchronization during a predetermined period of time) of the OSU 107, the ONU 30 switches the reception wavelength to the downlink wavelength, and establishes a connection with the OSU 107 using a backup downlink wavelength through an initial connection operation from the OSU 107 using the backup downlink wavelength. As a result, communication is recovered promptly. Next, an operation according to the present embodiment will be described.

Figure 3:
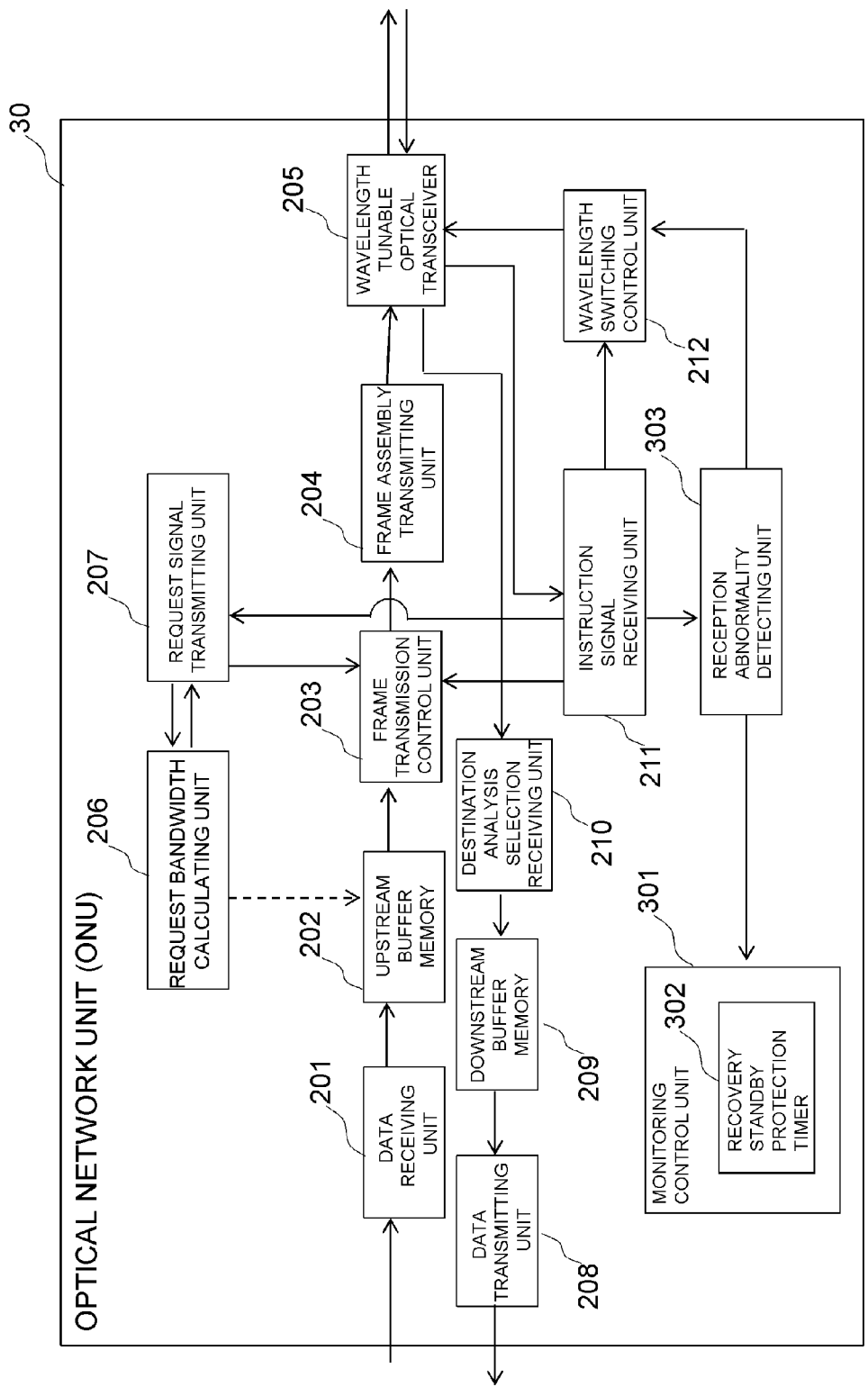
FIG. 3 is a configuration diagram illustrating an example of an ONU according to an embodiment of the present disclosure.

FIG. 3 illustrates the ONU 30 as an example of a configuration of an ONU according to the present embodiment. The ONU 30 includes a data receiving unit 201, a data transmitting unit 208, an uplink buffer memory 202, a downlink buffer memory 209, a destination analysis selection receiving unit 210, a frame transmission control unit 203, a frame assembly transmitting unit 204, a wavelength tunable optical transceiver 205, a request bandwidth calculating unit 206, a request signal transmitting unit 207, an instruction signal receiving unit 211, a wavelength switching control unit 212, a monitoring control unit 301, a recovery standby protection timer 302, and a reception abnormality detecting unit 303 functioning as an abnormality detecting unit.

Here, a main communication wavelength is assumed to include a current uplink wavelength and a current downlink wavelength of the ONU 30. Further, a backup communication wavelength is assumed to include a backup uplink wavelength and a backup downlink wavelength of the ONU 30. A new main communication wavelength is assumed to include an uplink wavelength and a downlink wavelength used by the ONU 30 after the abnormality of the OSU 107 is detected, and then switching of the wavelength used by the ONU 30 is performed.

Figure 2:
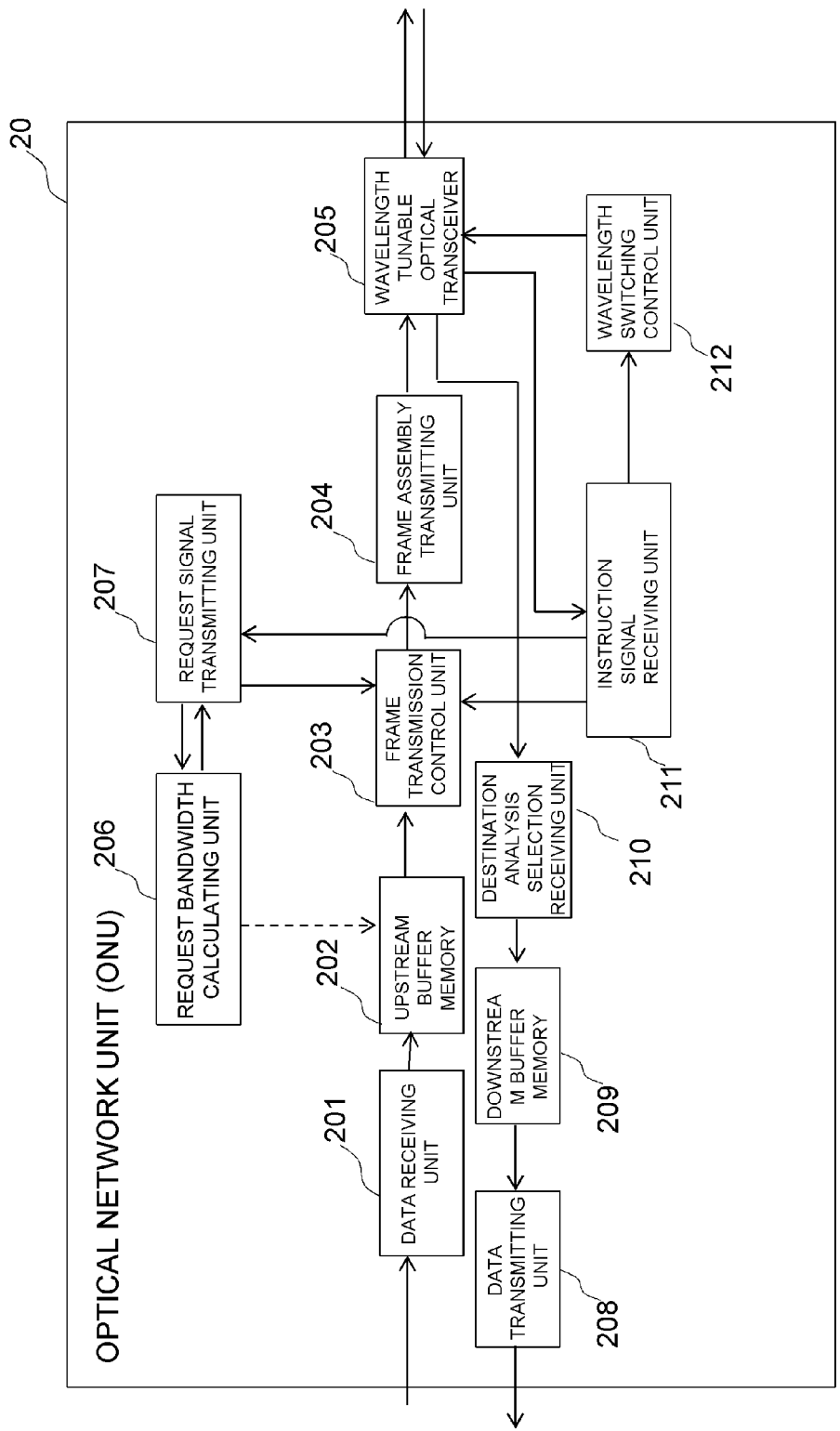
FIG. 2 is a configuration diagram of an ONU in an example of a wavelength tunable WDM/TDM-PON system related to the present disclosure.

In the ONU 30, the reception abnormality detecting unit 303 that detects the occurrence of an abnormality in the OSU 107 based on a state of the downlink wavelength signal is added to the ONU 20 of the WDM/TDM-PON illustrated in FIG. 2. Although not illustrated in FIG. 2 for the description of the operation, the monitoring control unit 301 that monitors the state of the ONU and gives an instruction and performs control such that information is transferred to the OLT 10 as necessary is added in FIG. 3. Further, the monitoring control unit 301 includes the recovery standby protection timer 302 used for determining whether or not communication from the OSU 107 in which an abnormality has occurred has been recovered. The configurations of the OLT 10 and the OSU 107 are similar to those in FIG. 1.

In FIG. 3, the reception abnormality detecting unit 303 constantly monitors the state of the downlink wavelength signal through the instruction signal receiving unit 211, detects interruption or out-of-synchronization of the downlink wavelength signal caused by the occurrence of an abnormality in the OSU 107, and instructs the wavelength switching control unit 212 to perform predetermined wavelength switching. However, in the present embodiment, the reception abnormality detecting unit 303 detects the state of the downlink wavelength signal through the instruction signal receiving unit 211, but this may be obtained directly from the downlink signal of the wavelength tunable optical transceiver 205 or may be information from the destination analysis selection receiving unit 210.

The reception abnormality detecting unit 303 includes a switching destination table in which the switching destination wavelength for performing the wavelength switching after the abnormality of the OSU 107 is detected is held in advance, and FIGS. 4 and 5 illustrate the switching destination table of the present embodiment. Each of the ONUs 30 has information about the current downlink wavelength and the backup downlink wavelength to be switched when an abnormality occurs in the OSU 107. Information of the switching destination table is given by the OLT 10 when the ONU 30 is initially connected. The OLT 10 includes the allocation ONU table of the current uplink and downlink wavelengths and the backup uplink and downlink wavelengths of the respective ONUs 30. The OLT 10 manages a correspondence table of the OSU 107 and the allocation ONU 30 illustrated in FIG. 6 and the wavelengths of the current uplink downlink and the backup uplink downlink for all the ONUs 30 allocated from the uplink and downlink wavelengths used by the OSU 107. The OLT 10 designates the current downlink wavelength and the backup downlink wavelength using the allocation ONU table when each ONU 30 is initially connected. The allocation ONU table of the OLT 10 is updated each time the allocation OSU 107 of the ONU 30 is changed, that is, each time the wavelength switching of the ONU 30 occurs.

The OLT 10 manages the ONUs 30 allocated to the OSUs 107 as illustrated in FIG. 6. In the wavelength tunable WDM/TDM-PON, each of the ONUs 30 can change the OSU 107 by switching and allocating the uplink and downlink wavelengths as described above with reference to FIG. 1. Thus, the OLT 10 is constantly aware of which ONU 30 is allocated to which OSU 107, and thus the allocation ONU table illustrated in FIG. 6 may be extracted and generated from management information of the correspondence relation between the OSU 107 and the ONU 30 constantly used by the OLT 10. This table is changed each time the wavelength switching of the ONU 30 occurs.

An optical communication abnormality-recovery method according to the present embodiment includes an abnormality detection process, a wavelength switching process, a DWBA process, an initial connection operation process, and a standby period of time measurement process. The abnormality detection process and the wavelength switching process are performed in order. The initial connection operation process and the standby period of time measurement process are performed after the wavelength switching process. The DWBA process is performed at an arbitrary timing according to an instruction given from the OLT 10.

The abnormality detection process is a process of determining the presence or absence of the abnormality of the OSU 107. The wavelength switching process is a process of switching the downlink wavelength or both of the downlink wavelength and the uplink wavelength used by the ONU 30 after the abnormality is detected in the abnormality detection process. The DWBA process is a process of allocating the backup communication wavelength to the ONU 30 in advance when the wavelength switching is performed. The initial connection operation process is a process of establishing a connection between the ONU 30 and the OLT 10, by measuring a round-trip delay time and allocating the backup communication wavelength to the ONU 30 in advance after the downlink wavelength or both of the uplink and downlink wavelengths used by the ONU 30 are switched in the wavelength switching process and after the main communication wavelength between the ONU 30 and the OLT 10 is instructed, and switching to the main communication wavelength is performed. The standby period of time measurement process is a process of measuring a standby period of time serving as a period of time after an abnormality has occurred in communication between the optical line terminal and the optical network unit.

Next, switching and communication recovery operations in the present embodiment when an abnormality occurs in the OSU 107 will be described. First, the reception abnormality detecting unit 303 of each of the ONUs #1 to #h generates and holds the switching destination table illustrated in FIGS. 4 and 5 according to an instruction given in the initial connection operation process or the DWBA process from the OLT 10. Here, the ONU #1 is assumed to be allocated to the OSU #1, a set of $\lambda_{1u}$ and $\lambda_{1d}$ is assumed to be used as the current uplink and downlink wavelengths, and a set of $\lambda_{2u}$ and $\lambda_{2d}$ is assumed to be as the backup uplink and downlink wavelengths. Further, the ONU #2 is assumed to be allocated to the OSU #2, a set of $\lambda_{2u}$ and $\lambda_{2d}$ is assumed to be used as the current uplink and downlink wavelengths, and a set of $\lambda_{3u}$ and $\lambda_{3d}$ is assumed to be as the backup uplink and downlink wavelengths. The ONU #h is assumed to be allocated to the OSU #m, a set of $\lambda_{mu}$ and $\lambda_{md}$ is assumed to be used as the current uplink and downlink wavelengths, and a set of $\lambda_{1u}$ and $\lambda_{1d}$ is assumed to be used as the backup uplink and downlink wavelengths. Thus, the ONU #1 holds information of $\lambda_{1d}$ as the current downlink wavelength and $\lambda_{2d}$ as the backup downlink wavelength, the ONU #2 holds information of $\lambda_{2d}$ as the current downlink wavelength and $\lambda_{3d}$ the backup downlink wavelength, and the ONU #h holds information of $\lambda_{md}$ as the current downlink wavelength and $\lambda_{1d}$ the backup downlink wavelength. Then, the reception abnormality detecting unit 303 determines the presence or absence of the abnormality of the OSU 107 based on the state of downlink wavelength signal according to the abnormality detection process. The abnormality of the OSU 107 is determined in the abnormality detection process when an optical input from the OSU 107 has been interrupted during a predetermined period of time, signal synchronization information has been lost during a predetermined period of time, or a report indicating the occurrence of an abnormality or the like is received from the OSU 107.

Upon detecting the abnormality of the OSU 107, the reception abnormality detecting unit 303 starts an operation for switching the downlink wavelength or both of the uplink and downlink wavelengths used by the ONU 30 according to the wavelength switching process. Specifically, a notification indicating that the abnormality of the OSU 107 has been detected is immediately given to the monitoring control unit 301 in the ONU 30, and the backup downlink wavelength is acquired with reference to the current downlink wavelength of its own ONU 30 in the switching destination table illustrated in FIG. 4. Then, an instruction indicating the switching destination wavelength is given to the wavelength switching control unit 212 so that switching to the backup downlink wavelength is performed, and reception is performed. The wavelength switching control unit 212 performs switching to the backup downlink wavelength according to the instruction given from the reception abnormality detecting unit 303. For example, when the abnormality of the OSU #1 is detected by the ONU #1, the reception abnormality detecting unit 303 of the ONU #1 switches the reception wavelength to $\lambda_{2d}$ serving as the backup downlink wavelength with reference to the switching destination table of the ONU #1 illustrated in FIG. 4, and receives the downlink wavelength signal of the OSU #2. Alternatively, as illustrated in FIG. 5, the uplink and downlink wavelengths may be changed to both of the backup uplink and downlink wavelengths.

Then, the monitoring control unit 301 of the ONU 30 switched to the backup uplink and downlink wavelengths sets a period of time for waiting for whether or not communication has been recovered by the wavelength switching to the recovery standby protection timer 302 and operates the timer. The recovery standby protection timer 302 starts to measure a period of time after an abnormality occurs in communication with the OLT 10. The recovery standby protection timer 302 may measure a period of time after switching to the backup uplink and downlink wavelengths is performed.

Then, the ONU 30 starts the initial connection operation according to the initial connection operation process. For example, the ONU #1 that has entered the state in which the downlink wavelength of the OSU #2 is received extracts information about the uplink and downlink wavelengths of the OSU #2 serving as information related to the initial connection operation from the downlink wavelength of the OSU #2, and performs switching to the wavelengths, and the OSU #2 performs measurement of the round-trip delay time of the ONU #1, exchange of information of the ONU #1, and the like, and performs registration so that the ONU #1 is allocated to the OSU #2. The start of the initial connection operation is preferably instructed using the downlink wavelength of the OSU #2, and a subsequent initial connection method is not consequential. For example, the initial connection operation need not be necessarily performed by the OSU #2, and the start of the initial connection operation may be instructed while switching the wavelength from the OSU #2 to another OSU 107.

The abnormality of the OSU 107 is detected by the OLT 10 as well. Upon detecting the abnormality of the OSU 107, the OLT 10 obtains information (the switching destination OSU 107 and the allocation ONU 30) of the backup destination of the abnormal OSU 107 with reference to the allocation ONU table of FIG. 6 and the switching destination table of FIGS. 4 and 5. For example, when an abnormality occurs in the OSU #1, since the backup uplink and downlink wavelengths of the ONU #1 that is under the control of the OSU #1 are $\lambda_{2u}$ and $\lambda_{2d}$, it is understood that the wavelength switching target is the ONU #1, and the backup destination OSU 107 is the OSU #2.

Then, the initial connection operation starts from the OSU #2 to the ONU #1. Since switching of the reception wavelength has already ended so that the downlink signal of the OSU #2 is received, the ONU #1 acquires information about the uplink wavelength of the OSU #2, for example, through a Discovery Gate signal or the like of the OSU #2, switches the uplink signal to the uplink wavelength of the OSU #2, and performs the initial connection operation with the OSU #2 again. Further, similarly to the normal initial connection, the multiplexing/separating unit performs a setting so that the downlink signal addressed to the ONU #1 is separated to be transferred to the OSU #2. The monitoring control unit 301 of the ONU 30 determines that switching to the backup OSU 107 has been completed based on the fact that the wavelength switching operation has been completed, and the abnormality detection of the reception abnormality detecting unit 303 has been eliminated.

Further, when the period of time measured by the recovery standby protection timer 302 exceeds the recovery standby period of time instructed in advance, the monitoring control unit 301 determines whether or not an abnormality has occurred in the backup uplink and downlink wavelengths. When the abnormality detection of the reception abnormality detecting unit 303 has not been eliminated even though the recovery standby protection timer 302 expires, the monitoring control unit 301 determines that an abnormality has occurred in the switching. The monitoring control unit 301 that has detected the occurrence of an abnormality in the switching performs an operation when the abnormality of the ONU 30 is detected, for example, performs the initial connection operation by device resetting or performs an operation indicating that an abnormality of the switching operation is detected.

When the initial connection operation by device resetting is performed, the DWBA process is performed. In this case, the ONU 30 receives an instruction indicating the main communication wavelength and the backup communication wavelength from the OLT 10 again, and holds the wavelengths in the switching destination table. The ONU 30 performs communication with the OSU 107 using the main communication wavelength, and then performs the optical communication abnormality-recovery method according to the present embodiment.

The present embodiment has five main features. A first feature lies in that the switching destination information is held as the switching destination table in advance, and switching is performed according to the switching destination table, and thus switching to the backup wavelength is easily performed. In the present disclosure, the switching destination information about the backup downlink wavelength or both of the backup uplink and downlink wavelengths used when an abnormality occurs in the OSU 107 is held in the ONU 30 as the switching destination table in advance, and when the reception abnormality detecting unit 303 of the ONU 30 detects the abnormality of the OSU 107, switching to the backup wavelength is performed according to the switching destination table, and thus switching to the backup wavelength and recovery of communication can be performed through a very simple configuration and control.

A second feature lies in that the device that performs switching without receiving switching information from another OSU 107 is provided. Further, even in the state in which the reception downlink wavelength is interrupted, and it is difficult to receive the downlink signal of another wavelength, since the switching destination wavelength used when an abnormality occurs is decided in advance, it is possible to perform the switching operation without instruction and information from another wavelength.

Figure 7:
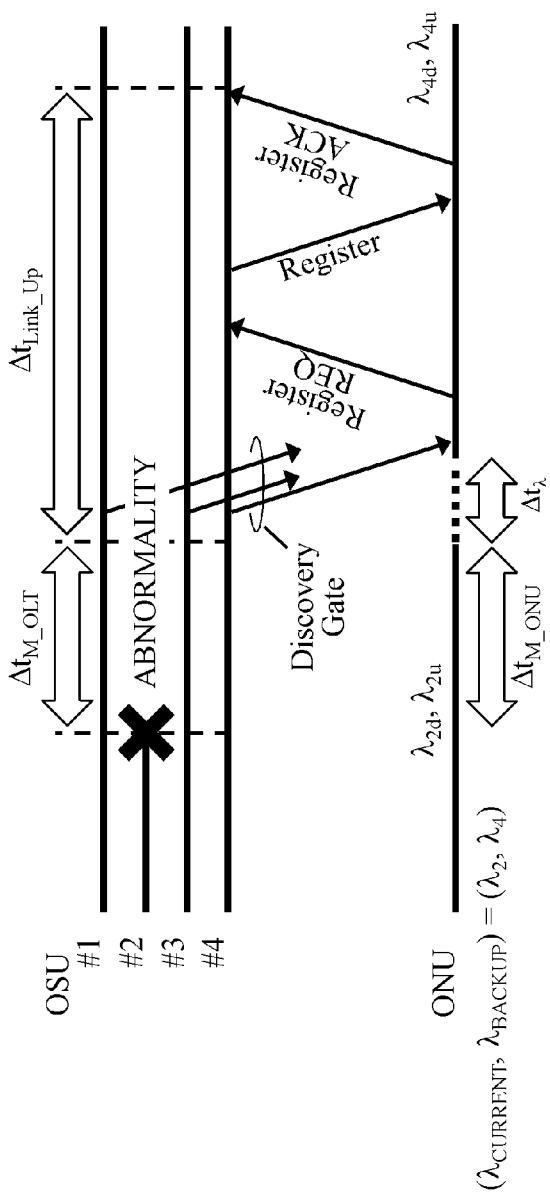
FIG. 7 illustrates an example of an initial connection operation according to the present embodiment.
Figure 8:
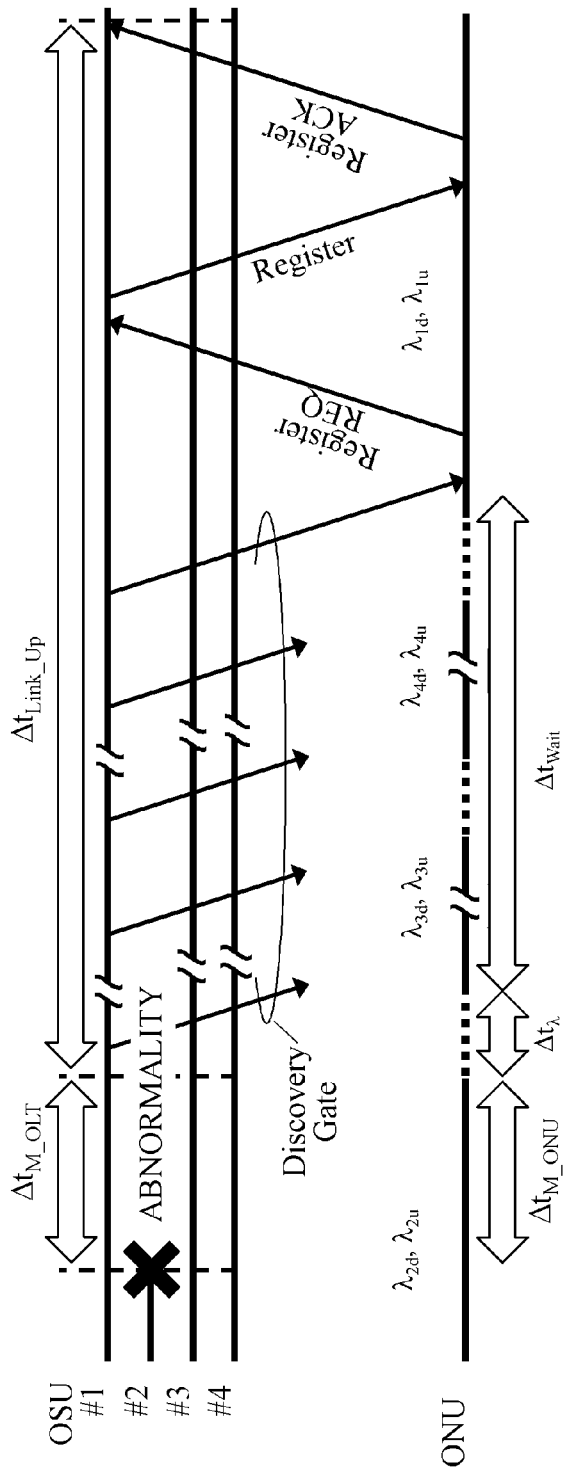
FIG. 8 illustrates a comparative example of an initial connection operation according to a comparative example.

FIG. 7 illustrates an example of the initial connection operation according to the present embodiment. FIG. 8 illustrates a comparative example of the initial connection operation according to a comparative example. In the comparative example illustrated in FIG. 8, since a wavelength after switching is not decided in advance, when a failure occurs in the OSU #2 of the main communication wavelengths $\lambda_{2u}$ and $\lambda_{2d}$ of the ONU, it is necessary to perform the discovery process for obtaining information related to the switching destination wavelength. When a wavelength sweeping scheme is used in the discovery process, it is not possible to start a registration process until the ONU sequentially switches the wavelengths, and the wavelengths $\lambda_{1u}$ and $\lambda_{1d}$ of the Discovery Gate signal match the wavelengths of the ONU. For this reason, a period $\Delta t_{Link\_Up}$ of time required for establishing a link in the comparative example needs a standby period $\Delta t_{Wait}$ of time until the Discovery Gate signal having the matching wavelength is received after the Discovery Gate signal initially received by the ONU is received. On the other hand, in the disclosure according to the present embodiment, since the wavelengths $\lambda_{4u}$ and $\lambda_{4d}$ are allocated as the backup communication wavelength in advance, the OLT can transmit the Discovery Gate signal from the OSU #4 of the wavelengths $\lambda_{4u}$ and $\lambda_{4d}$ immediately after switching to the backup communication wavelengths is performed. In the disclosure according to the present embodiment, period $\Delta t_{Link\_Up}$ of time required for establishing a link does not need the standby period $\Delta t_{Wait}$, and thus 1000 ms or more is required as $\Delta t_{Link\_Up}$ in the comparative example, whereas in the present embodiment, $\Delta t_{Link\_Up}$ can be shortened to up to about 100 ms (for example, see Non Patent Literature 4).

A third feature lies in that the switching process of the OLT 10 can be shared with the initial connection operation process. Since the initial connection operation is performed in the reconnection of the ONU 30, it is possible to deal with the abnormality of the OSU 107 through the same process as in the normal initial connection. In the present embodiment, as the process of initially connecting the ONU 30 to the OSU #2 is performed, information of the ONU #1 for execution can be transferred from the OSU #1 to the OSU #2, it is unnecessary to perform a new switching process when an abnormality occurs in the OSU.

A fourth feature lies in that it is possible to detect an abnormality in the switching operation by the recovery standby protection timer 302. Further, since the recovery standby protection timer 302 that counts the recovery standby period of time is installed, it is possible to detect the abnormal state caused by a failure in the switching operation to the backup uplink and downlink wavelengths as the timer count ends. Thus, it is possible to prevent the ONU 30 from entering the state in which it is not possible to establish the synchronization with the signal from the OLT 10 again after performing switching to the backup uplink and downlink wavelengths.

A fifth feature lies in that it is possible to disperse the switching destination. Further, since the relation between the current wavelength and the backup wavelength is appropriately decided in the switching destination table illustrated in FIGS. 4 and 5, it is possible to concentrate or disperse the OSUs 107 serving as the wavelength switching destination when an abnormality occurs in the OSU 107. For example, as illustrated in FIGS. 4 and 5, when backup wavelengths of all sets of uplink and downlink wavelengths are set not to overlap, pairs of the OSU 107 in which an abnormality occurs and the backup OSU 107 are necessarily different, and thus it is possible to disperse the OSUs 107 influenced by the occurrence of an abnormality. Meanwhile, it is possible to fix the OSU 107 serving as the switching destination when an abnormality occurs by setting uplink and downlink wavelengths of a certain OSU 107 as the backup uplink wavelength. Accordingly, it is possible to explicitly decide and operate the OSU 107 used as a backup system.

INDUSTRIAL APPLICABILITY

The optical communication system and the optical communication abnormality-recovery method according to the present disclosure can be applied to communication industry.

Specifically, the optical communication abnormality-recovery method according to the present disclosure can provide a reallocation method of a signal wavelength transmitted and received by the ONU, which is capable for reducing communication service interruption to be as short as possible when an abnormality occurs in an operating OSU or a preventive maintenance counter-measure of an OSU is performed, in the wavelength tunable WDM/TDM-PON. Further, the optical communication system according to the present disclosure is an optical communication system that can use the optical communication abnormality-recovery method according to the present disclosure.

REFERENCE SIGNS LIST

10: optical line terminal (OLT)
11: optical multiplexer/demultiplexer
12: optical multiplexer/demultiplexer
13: optical fiber
14: optical fiber
15: optical fiber
16: optical fiber
101: DWBA circuit
102: switching instruction signal generating unit
103: DWBA calculating unit
104: control signal transmitting unit
105: request signal receiving unit
106: multiplexing/separating unit
107: optical subscriber unit (OSU)
20: optical network unit (ONU)
201: data receiving unit
202: uplink buffer memory
203: frame transmission control unit
204: frame assembly transmitting unit
205: wavelength tunable optical transceiver
206: request bandwidth calculating unit
207: request signal transmitting unit
208: data transmitting unit
209: downlink buffer memory
210: destination analysis selection receiving unit
211: instruction signal receiving unit
212: wavelength switching control unit
30: optical network unit (ONU)

301: monitoring control unit
302: recovery standby protection timer
303: reception abnormality detecting unit
40: relay network

What is claimed is:

1. An optical communication system comprising:
a plurality of optical network units; and
an optical line terminal connected with the plurality of optical network units, wherein the optical network units and the optical line terminal switch between a plurality of wavelengths and perform communication,
wherein the optical network units and the optical line terminal perform the communication using a main communication wavelength,
wherein, when an abnormality is detected to occur in the communication between the optical line terminal and an optical network unit using the main communication wavelength, the optical network unit changes from the main communication wavelength for performing the communication with the optical line terminal to a backup communication wavelength, and wherein the backup communication wavelength is held in the optical network unit in advance of the change of the wavelength.

2. An optical communication system comprising:
a plurality of optical network units; and
an optical line terminal connected with the plurality of optical network units, wherein the optical network units and the optical line terminal switch between a plurality of wavelengths and perform communication,
wherein the optical network units and the optical line terminal perform the communication using a main communication wavelength,
wherein, when an abnormality is detected to occur in the communication between the optical line terminal and an optical network unit using the main communication wavelength, the optical network unit changes from the main communication wavelength for performing the communication with the optical line terminal to a backup communication wavelength, wherein the backup communication wavelength is held in the optical network unit in advance of the change of the wavelength, and
wherein the optical line terminal includes a dynamic wavelength and bandwidth allocation circuit that allocates the backup wavelength to the optical network unit.

3. An optical communication system comprising:
a plurality of optical network units; and
an optical line terminal connected with the plurality of optical network units, wherein the optical network units and the optical line terminal switch between a plurality of wavelengths and perform communication,
wherein the optical network units and the optical line terminal perform the communication using a main communication wavelength,
wherein, when an abnormality is detected to occur in the communication between the optical line terminal and an optical network unit using the main communication wavelength, the optical network unit changes from the main communication wavelength for performing the communication with the optical line terminal to a backup communication wavelength, wherein the backup communication wavelength is held in the optical network unit in advance of the change of the wavelength,
wherein the optical line terminal performs an initial connection operation including at least measurement of a round-trip delay time of the communication between the optical line terminal and the optical network unit using the backup communication wavelength to which the optical network unit has changed, and gives an instruction to the optical network unit indicating the main communication wavelength and the backup communication wavelength with which the optical network unit performs the communication with the optical line terminal to the optical network unit after the initial connection operation, and
wherein the optical network unit changes the wavelength for performing the communication with the optical line terminal from the backup communication wavelength to the main communication wavelength.

4. An optical communication system comprising:
a plurality of optical network units; and
an optical line terminal connected with the plurality of optical network units, the optical network units and the optical line terminal switch between a plurality of wavelengths and perform communication,
wherein the optical network units and the optical line terminal perform the communication using a main communication wavelength,
wherein, when an abnormality is detected to occur in the communication between the optical line terminal and an optical network unit using the main communication wavelength, the optical network unit changes from the main communication wavelength for performing the communication with the optical line terminal to a backup communication wavelength, wherein the backup communication wavelength is held in the optical network unit in advance of the change of the wavelength,
wherein the optical network unit includes a recovery standby protection timer that measures a period of time after an abnormality occurs in the communication between the optical line terminal and the optical network unit or a period of time after the wavelength is changed to the backup communication wavelength, and
wherein, when the period of time measured by the recovery standby protection timer exceeds a recovery standby period of time that is instructed in advance, the optical network unit determines that the communication between the optical network unit and the optical line terminal using the backup communication wavelength is in an abnormal state.

5. An optical communication abnormality-recovery method of changing a wavelength for performing communication between an optical network unit and an optical line terminal in an optical communication system in which a plurality of optical network units is connected with an optical line terminal, and the optical network units and the optical line terminal switch between a plurality of wavelengths, and perform communication, the optical communication abnormality-recovery method comprising, in order:
an abnormality detection process of detecting, by the optical network unit, an abnormality in communication between the optical network unit and the optical line terminal when using a main communication wavelength; and
a wavelength switching process of changing the wavelength with which the optical network unit performs the communication with the optical line terminal from the main communication wavelength to a backup communication wavelength, wherein the backup communication wavelength is held in the optical network unit in advance of changing the wavelength when the abnormality is detected by the abnormality detection process.

6. An optical communication abnormality-recovery method of changing a wavelength for performing communication between an optical network unit and an optical line terminal in an optical communication system in which a plurality of optical network units is connected with an optical line terminal, and the optical network units and the optical line terminal switch between a plurality of wavelengths, and perform communication, the optical communication abnormality-recovery method comprising, in order:

an abnormality detection process of detecting, by the optical network unit, an abnormality in communication between the optical network unit and the optical line terminal when using a main communication wavelength;

a wavelength switching process of changing the wavelength with which the optical network unit performs the communication with the optical line terminal from the main communication wavelength to a backup communication wavelength, wherein the backup communication wavelength is held in the optical network unit in advance of changing the wavelength when the abnormality is detected by the abnormality detection process; and a dynamic wavelength and bandwidth allocation process of allocating the backup communication wavelength to the optical network unit.

7. An optical communication abnormality-recovery method of changing a wavelength for performing communication between an optical network unit and an optical line terminal in an optical communication system in which a plurality of optical network units is connected with an optical line terminal, and the optical network units and the optical line terminal switch between a plurality of wavelengths, and perform communication, the optical communication abnormality-recovery method comprising, in order:

an abnormality detection process of detecting, by the optical network unit, an abnormality in communication between the optical network unit and the optical line terminal when using a main communication wavelength;

a wavelength switching process of changing the wavelength with which the optical network unit performs the communication with the optical line terminal from the main communication wavelength to a backup communication wavelength, wherein the backup communication wavelength is held in the optical network unit in advance of changing the wavelength when the abnormality is detected by the abnormality detection process;

an initial connection operation process of performing, by the optical line terminal and the optical network unit, an initial connection operation including at least measurement of a round-trip delay time of the communication between the optical line terminal and the optical network unit using the backup communication wavelength, giving, by the optical line terminal to the optical network unit, an instruction indicating the main communication wavelength and the backup communication wavelength with which the optical network unit performs the communication with the optical line terminal after the initial connection operation, and changing, by the optical network unit, the wavelength with which the optical network unit performs the communication with the optical line terminal from the backup communication wavelength to the main communication wavelength after the wavelength switching process.

8. An optical communication abnormality-recovery method of changing a wavelength for performing communication between an optical network unit and an optical line terminal in an optical communication system in which a plurality of optical network units is connected with an optical line terminal, and the optical network units and the optical line terminal switch between a plurality of wavelengths, and perform communication, the optical communication abnormality-recovery method comprising, in order:

an abnormality detection process of detecting, by the optical network unit, an abnormality in communication between the optical network unit and the optical line terminal when using a main communication wavelength;

a wavelength switching process of changing the wavelength with which the optical network unit performs the communication with the optical line terminal from the main communication wavelength to a backup communication wavelength, wherein the backup communication wavelength is held in the optical network unit in advance of changing the wavelength when the abnormality is detected by the abnormality detection process;

a standby period of time measurement process of measuring, by the optical network unit, a period of time after an abnormality occurs in the communication between the optical line terminal and the optical network unit or a period of time after the wavelength is changed to the backup communication wavelength, wherein when the period of time measured by the standby period of time measurement process exceeds a recovery standby period of time that is instructed in advance, the communication between the optical network unit and the optical line terminal using the backup communication wavelength is determined to be in an abnormal state.

9. The optical communication system according to claim 2, wherein the optical line terminal performs an initial connection operation including at least measurement of a round-trip delay time of the communication between the optical line terminal and the optical network unit using the backup communication wavelength to which the optical network unit has switched, and gives an instruction to the optical network unit indicating the main communication wavelength and the backup communication wavelength with which the optical network unit performs the communication with the optical line terminal to the optical network unit after the initial connection operation, and wherein the optical network unit changes the wavelength with which the optical network unit performs the communication with the optical line terminal from the backup communication wavelength to the main communication wavelength.

10. The optical communication system according to claim 2, wherein the optical network unit further includes a recovery standby protection timer that measures a period of time after an abnormality occurs in the communication between the optical line terminal and the optical network unit or a period of time after the wavelength is changed to the backup communication wavelength, and wherein when the period of time measured by the recovery standby protection timer exceeds a recovery standby period of time that is instructed in advance, the optical network unit determines that the communication between the optical network unit and the optical line terminal using the backup communication wavelength is in an abnormal state.

11. The optical communication system according to claim 3,
wherein the optical network unit further includes a recovery standby protection timer that measures a period of time after an abnormality occurs in the communication between the optical line terminal and the optical network unit or a period of time after the wavelength is changed to the backup communication wavelength, and
wherein when the period of time measured by the recovery standby protection timer exceeds a recovery standby period of time that is instructed in advance, the optical network unit determines that the communication between the optical network unit and the optical line terminal using the backup communication wavelength is in an abnormal state.

12. The optical communication system according to claim 9,
wherein the optical network unit further includes a recovery standby protection timer that measures a period of time after an abnormality occurs in the communication between the optical line terminal and the optical network unit or a period of time after the wavelength is changed to the backup communication wavelength, and
wherein when the period of time measured by the recovery standby protection timer exceeds a recovery standby period of time that is instructed in advance, the optical network unit determines that the communication between the optical network unit and the optical line terminal using the backup communication wavelength is in an abnormal state.

13. The optical communication abnormality-recovery method according to claim 6, further comprising:
an initial connection operation process of performing, by the optical line terminal and the optical network unit, an initial connection operation including at least measurement of a round-trip delay time of the communication between the optical line terminal and the optical network unit using the backup communication wavelength, giving, by the optical line terminal to the optical network unit, an instruction indicating the main communication wavelength and the backup communication wavelength with which the optical network unit performs the communication with the optical line terminal, after the initial connection operation, and changing, by the optical network unit, the wavelength with which the optical network unit performs the communication with the optical line terminal, from the backup communication wavelength to the main communication wavelength after the wavelength switching process.

14. The optical communication abnormality-recovery method according to claim 6, further comprising:
a standby period of time measurement process of measuring, by the optical network unit, a period of time after an abnormality occurs in the communication between the optical line terminal and the optical network unit or a period of time after the wavelength is changed to the backup communication wavelength,
wherein when the period of time measured by the standby period of time measurement process exceeds a recovery standby period of time that is instructed in advance, the communication between the optical network unit and the optical line terminal using the backup communication wavelength is determined to be in an abnormal state.

15. The optical communication abnormality-recovery method according to claim 7, further comprising:
a standby period of time measurement process of measuring, by the optical network unit, a period of time after an abnormality occurs in the communication between the optical line terminal and the optical network unit or a period of time after the wavelength is changed to the backup communication wavelength,
wherein when the period of time measured by the standby period of time measurement process exceeds a recovery standby period of time that is instructed in advance, the communication between the optical network unit and the optical line terminal using the backup communication wavelength is determined to be in an abnormal state.

16. The optical communication abnormality-recovery method according to claim 13, further comprising:
a standby period of time measurement process of measuring, by the optical network unit, a period of time after an abnormality occurs in the communication between the optical line terminal and the optical network unit or a period of time after the wavelength is changed to the backup communication wavelength,
wherein when the period of time measured by the standby period of time measurement process exceeds a recovery standby period of time that is instructed in advance, the communication between the optical network unit and the optical line terminal using the backup communication wavelength is determined to be in an abnormal state.

* * * * *